United States Patent [19]

Garware et al.

[11] 4,399,265
[45] Aug. 16, 1983

[54] PROCESS OF PRODUCTS UV-STABILIZED POLYESTER MATERIALS

[75] Inventors: Shashikant B. Garware; Ramaswamy Ananthanarayanan, both of Bombay, India

[73] Assignee: Garware Plastics & Polyester Ltd., Bombay, India

[21] Appl. No.: 459,050

[22] Filed: Jan. 19, 1983

[51] Int. Cl.³ .................................... C08G 63/16
[52] U.S. Cl. ........................... 528/308.2; 528/272; 528/493; 528/495; 528/502
[58] Field of Search ............... 528/308.2, 493, 495, 528/502, 272; 524/359, 186

[56] References Cited

U.S. PATENT DOCUMENTS

| | | | |
|---|---|---|---|
| 2,818,400 | 12/1957 | Forster | 523/510 |
| 2,910,259 | 12/1959 | Naylor et al. | 524/338 |
| 3,126,414 | 3/1964 | Spatz et al. | 568/333 |
| 3,322,719 | 5/1967 | Peilstöcker | 524/91 |
| 3,506,610 | 4/1970 | Dressler et al. | 524/337 |
| 3,720,635 | 3/1973 | Metzner et al. | 524/359 |
| 3,943,105 | 3/1976 | Hermes | 525/437 |
| 4,161,578 | 7/1979 | Herron | 528/308.2 |
| 4,179,432 | 12/1979 | Molt | 524/178 |
| 4,271,287 | 6/1981 | Shah | 528/308.2 |

*Primary Examiner*—Lucille M. Phynes
*Attorney, Agent, or Firm*—James & Franklin

[57] ABSTRACT

Polyesters are combined with UV-stabilizing substances in order to produce an end product, such as a film, sheet, ribbon or filament, by mixing polyester granules and the UV-stabilizing substance in powdered form at an elevated temperature such that at least the exterior surface of the polyester granules is soft, thereby to cause the powdered UV-stabilizing substance to adhere to the individual polymer granules, the granules with the powder adhering thereto are then dried, and they are then passed through an extruder or otherwise formed into an end product.

18 Claims, No Drawings

PROCESS OF PRODUCTS UV-STABILIZED POLYESTER MATERIALS

This invention relates to a method for producing polyester materials to which UV-stabilizing substances have been added so that the end product, usually in the form of an extruded film sheet, ribbon or filament will more reliably withstand ambient conditions and in particular will more reliably withstand the effect of sunlight, without significant deterioration.

While the end products are usually in the form of film, sheets, ribbons or filaments, one of the main areas of use of products of the type in question is as an essentially transparent sheet placed on or in windows in order to minimize the amount of heat and glare which passes through the window. When so used the sheets are quite thin, and are commonly termed films. The invention will here be specifically described with reference to the formation of such films, which will, for purposes of convenience, be here termed "sheets," but it will be understood that the invention is applicable to all end products into which the polyester material may be fabricated.

It has been indicated, one of the main areas of use of the sheets in question is to control the transmission of light and heat through the window. When the polyester materials are used for this purpose, they are generally called solar control films commonly taking form of a laminate base of very lightly metalized (control density deposition) polyester film which is then laminated to a dyed clear UV stabilized polyester film. The laminated structure allows the metal to be buried between the two layers of polyester film to protect the metallic coating from oxidative degradation. This laminated film is used in solar control application as solar control film when applied to windows it operates as a transparent insulation material developed to reduce the transmission of heat and glare from the sun through windows. This film reduces air-conditioning energy consumption. It virtually eliminates the UV rays which are present in the sunlight, which in principle causes fabric fading, finished surface deterioriation. Under winter conditions it tends to reduce the heat loss through the glass, thereby reduces heating energy consumption.

Sunlight comprises energy in the visible range and in the ultraviolet range. It is the ultraviolet component of sunlight which is primarily responsible for undesired interior effects such as the fading and deterioration of fabrics and plastics within a room. It therefore is desirable that the solar control films minimize to as great a degree as possible the transmission of ultraviolet light therethrough. While polyester materials are somewhat effective in that regard, there is room for improvement in their ability to prevent transmission of ultraviolet light. Moreover, such polyester sheets are themselves strongly subject to deterioration under the influence of ultraviolet light. It has long been known that there are substances which, when added to the polyester, will not only improve the degree to which the polyester sheet resists transmission of ultraviolet light, but also will increase the resistance of the sheets to deterioration when subjected to ultraviolet light. Many such materials have been proposed in the past.

There are in general two main methods which have been employed to produce polyester films protected against UV action by the addition of such substances. In one method the UV-stabilizing substance and the polyester are mixed together and then conveyed to an extruder from which a desired end product is expressed. In another method the UV-stabilizing substance is injected into the polymer while the polymer is being extruded. While both of these methods have been commercially used by the assignees (proposed) M/s. Garware Plastics and Polyester Limited, Bombay, India, and while the products resulting therefrom have been considerably improved with respect to resistance to UV when compared to polyester films that do not contain the UV-stabilizers, the end products have nevertheless presented significant problems. In the first place, while they are more resistant to UV than what preceded them, they are still of relatively limited life when subjected to strong sunlight. In the second place, the mixing methods when have been employed in the past apparently do not produce a truly homogeneous mix of polyester and UV-stabilizing substance, so that the resistance of the sheets to sunlight is literally spotty—certain areas of the sheet deteriorate more rapidly than other areas. In the third place, the mixing of the polyester with the UV-stabilizing substance has been relatively inefficient, as a result of which an excessively large amount of the stabilizing substance must be used, considerably more than eventually winds up performing its desired function in the finished sheet, and this, of course, adds appreciably to the cost of the sheet. In the fourth place, when many UV-stabilized sheets of the prior art are scratched or exposed to boiling water or to solvents such as acetone they tend to lose the UV-stabilizing substances and thus their sunlight resistance is weakened. Moreover, in some instances in the prior art polyhydric alcohol is used as part of the manufacturing process, and the polyhydric alcohol in turn adversely affects the ability of the sheet to reliably receive the desired vapor-deposited aluminum layers; black spots form on the metal surface and the metal adheres poorly to the polyester film.

It is the prime object of the present invention to provide a process for the manufacture of polyester film, and particularly polyethylene terephthalate film, which has a greatly improved resistance to ultraviolet light and which more effectively resists the transmission therethrough of ultraviolet light when compared to what has existed along these lines in the past.

It is a further object of the present invention to provide a method for manufacture of polyester sheets which is more efficient and less costly than prior art methods, which can be carried out with standard available manufacturing equipment, and which produces an end product which is extremely well adapted to use as a solar control film.

It is another object of the present invention to provide a process which will effectively and homogeneously mix the polyester material and the UV-stabilizing substance so that they will reliably stay together uniformly during the manufacturing process and thereafter.

It is a further object of the present invention to devise a process for making UV-stabilized polyester film which will resist adverse climatic and other external conditions to which it may be subjected, which can readily, effectively and reliably receive a vapor-deposited aluminum layer thereon, and which will exhibit an exceptionally long life, particularly with regard to discoloring, spotting or darkening, even when subjected to long periods of exposure to intense sunlight.

These objectives are achieved by mixing the polyester material in the form of granules with the UV-stabilizing substance in powdered form at a temperature such that at least the outer surface of the granules soften. Such a temperature, in the case of polyethylene terephthalate, is from about 150°–180° C. At those temperatures the polyester starts to crystallize and the heat of crystallization renders the surface of the polymer granules soft and sticky. The stabilizers at this temperature thus stick to the surface of the polymer, and that adhesion is believed to be enhanced by the tendency of the stabilizers to melt at that temperature. What is believed to happen is that the adhesion between the polymer and the stabilizer is so good that the stabilizer powder strongly resists being rubbed off from the polyester granules to which the powdered particles have attached themselves. Because of this adhesive effect, the bulk of the powdered stabilizer introduced into the mixing chamber adheres to polyester granules, thus giving rise to efficient use of the stabilizer—a very high proportion of the stabilizer that is introduced finally ends up in the end product, where it performs its designed function.

The mixing of the polyester granules and the stabilizer powder can be carried out in conventional mixing equipment. A particularly effective method involves introducing polyethylene terephthalate granules into a high shear mixer and, while mixing of the granules alone takes place, applying heat so as to raise the temperature of the granules. When the granules reach about 70° C. crystallization of the polymer commences, after which the polymer granule temperature increases rapidly because of the combined effect of the external heat which is applied and the heat of crystallization which is internally generated. The UV stabilizing substance is added to the polymer granules in the mixer when they reach a temperature of about 130°–160° C. The amount of stabilizer added will depend upon the particular end use of the polyester material. It is usually desired that the end product contain stabilizer in the range of 0.5–2.0% by weight, by a slight excess of stabilizer may be added to the mixture in order to make allowance for materials sticking to the wall of the mixing equipment and that generally small amount of stabilizer which does not adhere to polymer granules. This mixing step is terminated when the temperature of the polymer granules rises to about 170°–180° C. The termination temperature is determined on the basis of the mixing time required for obtaining a homogeneous and uniform penetration of the stabilizer to the polymer granules—it is believed that the UV stabilizing powder, when coated on the softened polyester granules, penetrates those granules. A normal mixing time would be around 5 to 10 minutes from the time of commencement of the mixing of the two components. It is preferred that the mixer have a variable or adjustable speed to maximize proper mixing and to minimize the formation of fines. The mixing speed should be sufficient to produce enough turbulence to avoid agglomeration of the polymer granules once they commence to soften, but should not be so high that the polymer granules will be ground down excessively. Agglomeration inhibits drying and makes extrusion more difficult. Grinding down the granules is not wanted because it involves loss of polymer in the fines, and also because excessively small granules will, in the extrusion process, tend to degrade the quality of the polyester film produced.

The next step is to separate the polyester granules with stabilizing powder adhered thereto from what may be termed "fines," to wit, such of the stabilizer as did not adhere itself to the polyester granules, as well as any small particles of polyester which may have broken off or been ground down from the polyester granules in the course of the mixing step. This separation of the granules from the fines may be accomplished by cooling the mixture to room temperature or to about 50° C. or to any other suitable temperature and then sieving it.

Next the polyester granules with stabilizer adhering thereto are dried. It is believed that this is an important aspect of the method of the present invention. Our investigation leads us to believe that moisture remaining in the polymer granules tends to hydrolyze those granules, which reduces their molecular weight, and the lower the molecular weight of the polymer the more difficult it is to extrude it into a continuous sheet. The problem produced by moisture is exacerbated by the fact that the UV-stabilizing substances themselves tend to carry appreciable amounts of moisture, and when the stabilizer powder is physically combined with the polymer granule the moisture carried by the stabilizer will have the same deleterious effect as the moisture initially carried by the polymer granule itself. In the making of polyethylene terephthalate films of about ½ or 1 mil in thickness with benzophenone or benzotriazole type UV stabilizers, we find it desirable to reduce the moisture content of the granule—stabilizer combination to at least about 0.005% by weight.

While there is no particular magic in the use of one type of dryer over another, provided that the desired end result is achieved, in industrial manufacture speed, reliability, and uniformity of operation are very important. For those reasons we have found it very effective to utilize a standard hopper-dryer for the drying step. Such a unit comprises an elongated tower where the granules and adhered stabilizer are continuously introduced at the top and moved down while hot, dry air is pumped into the dryer from the bottom and moves up in counter-current direction with respect to the flow of the polymer granules. The air may be heated to a temperature of 180°–200° C. The air not only heats the polymer and stabilizer to drive off moisture therefrom but also carries that moisture away.

Another type of equipment which can advantageously be used for this purpose is a high vacuum tumbler dryer. Such a piece of equipment comprises a rotated drum into which the coated granules are fed. The unit is heated, as by passing a heated fluid through an external jacket, and high vacuum is applied inside the dryer. The drying takes place by virtue of the heat transmitted to the granules and the moisture is drawn off by the vacuum.

As at present advised we prefer to use the hopper dryer rather than the high vacuum tumbler dryer because the latter has a tendency to create more dust particles and, because the granules must remain in it longer than if the hopper dryer is employed, because the UV stabilizer substances tend to become degenerated.

We prefer to mount the dryer in direct communication with the inlet to the extruder, so that the dried granules with stabilizer adhered thereto will reliably remain in that dried condition when they are being extruded. Indeed, the heater may be directly mounted above the extruder so that there is virtually no lost motion between heater output and extruder input.

The extruder may be of conventional form for the material in question and the material may be extruded either as a filament, a ribbon, or a sheet, or in any other form desired. The extrusion step is conventional in connection with polyester materials, and no special precautions or procedures are required to extrude the polyester-stabilizer granules formed in accordance with the present invention. It may be mentioned, however, that because of the presence of the UV stabilizer care should be taken that the extruder zone temperatures as well as the melt line temperatures are maintained at a value at least 10° C. lower than the normal set point so that the polyester melt temperature does not exceed about 275°–280° C., in order to avoid oxidation degradation of the polymer-stabilizer combination.

As is well known in the art, oxidation degradation of the end product, which tends to produce yellowing and deterioration, may be minimized by adding appropriate amounts of an anti-oxidant such as Erganox, a product manufactured by Ciba-Geigy, prior to drying.

While the method of the present invention has been here described in conjunction with the use of extrusion to form the end product, it will be understood that there is not essential; the end product could be formed in other ways from the dried polymer granules carrying the stabilizer.

The method of the present invention is particularly designed for use with polyesters, of which polyethylene terephthalate is a typical and very widely used member, because materials of that type, particularly when subjected to extrusion, are extremely moisture-sensitive, something which is not characteristic of most other types of synthetic materials from which extruded products are commonly made. The polyethylene terephthalate granules which have been used in producing film in accordance with the present invention, as available on the market, have a moisture content of approximately 0.2% by weight.

There are many substances known to be useful as UV stabilizers in connection with polyester materials. Some are disclosed in Forster U.S. Pat. No. 2,818,400 of Dec. 31, 1957, entitled "Unsaturated Polyester Resins Stabilized With 2-Hydroxy-5-Salicylylbenzophenone," Spatz U.S. Pat. No. 3,126,414 of Mar. 24, 1964 entitled "4-Alkoxy-5-Halo-2-Hydroxy-Benzophenones," Dressler U.S. Pat. No. 3,506,610 of Apr. 14, 1970 entitled "Benzophenone Ultraviolet Light And Oxidation Stabilizers For Plastic Materials," and Hermes U.S. Pat. No. 3,943,105 of Mar. 9, 1976 entitled "Process For Treating Dyed and Undyed Polyester Materials With An Agent To Overcome Or Inhibit The Destructive Effects Of Ultraviolet Light." The process of the present invention is directed to ensuring the intimate and reliable combination of powdered stabilizer with polyester granule to produce a reliably homogeneous product, and the specific chemical composition of the stabilizer material is not critical thereto. However, it is believed that the method is particularly effective when used with stabilizer materials of the benzotriazole and benzophenone (hydroxy benzophenone) types, and excellent results have been obtained in connection with the use of 2,2'-dihydroxy-4,4'-dimethoxy-benzophenone, 2,2', 4,4'-tetrahydroxy-benzophenone, and 2-(2-hydroxy-3,5-di-tertiary-amyl-phenyl)-2H-benzotriazole. These stabilizer substances are used in conventional amounts.

In one particular example, amorphous polyethylene terephthalate granules having an intrinsic viscosity of 0.65–0.66 and a moisture content of about 0.2% by weight were used. 50 kg. of this material were charged to a high sieved mixer having a heating jacket. 1000 grams of 2,2'-dihydroxy-4,4'-dimethoxy-benzophenone were added as a UV stabilizer. The procedures of increasing the temperature of the polymer granules, the time when the UV stabilizer was added and the other details of the mixing operation were all as set forth in the description above. The mixing time was about six minutes from the time the polymer was charged into the mixer and the temperature of the mixture was about 170° C. when mixing was terminated. The granules were then sieved, and the polymer granules were gradually fed into a hopper dryer mounted directly above the extruder, the output from the hopper dryer was fed directly to the extruder, and a one mil thick polyester film was extruded. That film was subjected to about 2000 hours of UV radiation with no adverse effects. Its tensil strength, elongation, and light transmission properties were at the end of that 2000 hours almost identical with the properties of the freshly extruded film. No fading was observed even after a period of 3000 hours of subjection to light radiation. Ultraviolet transmission through the film did not exceed 2% at 358 nm. The ultraviolet transmission figure equaled or exceeded figures for UV stabilized polyester films made by other methods, and the resistance to the adverse effects of being subjected to UV radiation upon the film made by the present invention was far superior to films made in other and conventional ways. The life of films made in accordance with the present invention is far greater than the life of competitive films available on the market.

From the above it will be seen that the method of the present invention does not require the use of any special equipment and is well suited to production conditions, but produces an end product which is significantly superior to products of comparable composition which have heretofore been available on the market. A very high percentage of the relatively costly UV stabilizer material that is introduced into the system ends up in the end product where it performs its expected function, thus making the process an efficient one from a production point in view. Moreover, the combination of the polyester and the UV stabilizer is effected quickly and efficiently, and in such a manner that the combination may be readily extruded or otherwise formed into an end product, with the stabilizer homogeneously and permanently distributed throughout the volume of the end product. Significantly this is accomplished without having to use any additional chemicals which, in the end product, might adversely affect the affixation of a metallized layer to a face of a product.

While the process of the present invention has been described above with some specificity, it will be apparent that the scope of the instant invention is not so specifically limited, but is instead of the scope defined in the appended claims.

We claim:

1. The process of producing UV-stabilized polyester materials which comprises:
   (1) heating polyester granules to a temperature of about 150°–180° C.;
   (2) mixing a powdered UV-stabilizing substance with said heated granules, thereby producing polyester granules to which said powdered substance is attached;
   (3) then subjecting said powder-carrying granules to a drying step effective to reduce the moisture content thereof to no more than about 0.005% by weight; and (4) then forming said dried powder-carrying granules into a useful body, such as a film, sheet, ribbon or filament.

2. The process of claim 1, in which said polyester comprises polyethylene terephthalate.

3. The process of claim 2, in which said UV-stabilizing substance is a member of the group consisting of o-hydroxy benzophenones, benzotriazoles, and mixtures thereof.

4. The process of claim 1, in which said UV-stabilizing substance is a member of the group consisting of o-hydroxy benzophenones, benzotriazoles, and mixtures thereof.

5. The process of claim 1, in which, between steps (2) and (3), fines are separated out from the powder-carrying granules.

6. The process of claim 1, in which said forming step (4) is an extrusion step carried out promptly after the drying step (3).

7. The process of claim 6, in which said polyester comprises polyethylene terephthalate and in which said UV-stabilizing substance is a member of the group consisting of o-hydroxy benzophenones, benzotriazoles, and mixtures thereof.

8. The process of claim 6, in which the powder-carrying granules, after being dried in step (3), are directly fed into an extruder and extruded therefrom.

9. The process of claim 1, in which the drying step (3) is carried out at a temperature of about 180°–200° C.

10. The process of claim 9, in which the drying step (3) is carried out while the powder-carrying granules are agitated.

11. The process of claim 10, in which said polyester comprises polyethylene terephthalate and in which said UV-stabilizing substance is a member of the group consisting of o-hydroxy benzophenones, benzotriazoles, and mixtures thereof.

12. The process of claim 9, in which the drying step (3) is carried out while the powder-carrying granules are agitated and fed through a container in which heated gas is provided in flow counter-current to the fed granules.

13. The process of claim 9, in which the drying step (3) is carried out in a heated tumbler including vacuum means to draw off moisture.

14. The process of producing UV-stabilized polyester materials which comprises:
   (1) heating polyester granules to a temperature at which the polymer surface of the granules becomes soft and sticky;
   (2) agitating said heated polyester granules and mixing them with a powdered UV-stabilizing substance, thereby to cause said powdered substance to adhere to said heated granules;
   (3) cooling said powder-carrying granules and separating fines therefrom;
   (4) drying said powder-carrying granules; and
   (5) then feeding said dried powder-carrying granules into an extruder and extruding the UV-stabilized polyester material therefrom.

15. The process of claim 14, in which said polyester comprises polyethylene phthalate.

16. The process of claim 15, in which said UV-stabilizing substance is a member of the group consisting of o-hydroxy benzophenones, benzotriazoles, and mixtures thereof.

17. The process of claim 14, in which said UV-stabilizing substance is a member of the group consisting of o-hydroxy benzophenones, benzotriazoles, and mixtures thereof.

18. The process of claim 13, in which said drying step (4) is carried out in a hopper dryer, and in which the dried granules are fed directly from said hopper dryer into said extruder.

* * * * *